United States Patent

Pike

[11] 3,954,311
[45] May 4, 1976

[54] BEARING RETAINER
[75] Inventor: Ian Maxwell Pike, Mordialloc, Australia
[73] Assignee: Illinois Tool Works Inc., Chicago, Ill.
[22] Filed: Feb. 10, 1975
[21] Appl. No.: 548,705

[30] Foreign Application Priority Data
Feb. 12, 1974 Australia.............................. 6561/74

[52] U.S. Cl. ................................... 308/25; 308/30; 308/34; 403/195
[51] Int. Cl.² ......................................... F16C 35/08
[58] Field of Search ........... 403/195, 196, 197, 199, 403/201; 16/2; 308/15, 25, 26, 30, 27, 28, 34

[56] References Cited
UNITED STATES PATENTS
1,215,595    2/1917    Weikert et al. ................. 403/195 X
1,364,529    1/1921    Thomas, Jr. ..................... 403/195 X
1,445,239    2/1923    Reddig ............................. 308/25 X
3,467,452    9/1969    McElroy ............................. 308/26

Primary Examiner—Frank E. Werner
Assistant Examiner—Randolph A. Reese
Attorney, Agent, or Firm—Jack R. Halvorsen; Robert W. Beart

[57] ABSTRACT

A bearing retainer comprising a base having a hole therein to receive a generally cylindrical housing, the housing having a plurality of upper lugs extending outwardly and downwardly therefrom, a plurality of lower lugs extending outwardly and upwardly, and a plurality of inwardly directed projections in the housing, the parts being so arranged that, in use, the plurality of upper lugs act upon the base and the plurality of lower lugs act upon a panel so as to retain the base, the housing and the panel in assembled relation.

6 Claims, 4 Drawing Figures

BEARING RETAINER

This invention relates to bearings and it refers particularly, though not exclusively, to a retainer for mounting a bearing in the wall of ducting, as in ducting for heating or air conditioning installations.

Existing bearings and bearing retainers of this nature have previously been made with a zinc die cast housing and requiring a bronze bush to be inserted for the bearing. The housing requires two holes to be drilled into the sheet metal panel and is fixed by screws or rivets.

It is therefore the principal object of the present invention to provide improved means for mounting in the wall of a duct a bearing for a shaft or a pivotally movable control member.

Another object of the present invention is to provide a bearing retainer means which may be readily mounted in the wall of ducting, as sheet metal ducting or other thin-walled ducting.

A further object of the invention is to provide a bearing retainer means for mounting in the wall of ducting and which may be used for mounting either open-ended or closed-end bearings or the bearing for a swivel joint.

With the above and other objects in mind the present invention provides a bearing retainer comprising a base having a hole therein to receive a generally cylindrical housing, said housing having a plurality of upper lugs extending outwardly and downwardly therefrom, a plurality of lower lugs extending outwardly and upwardly therefrom, and a plurality of inwardly directed projections in said housing, the parts being so arranged that, in use, said plurality of upper lugs act upon a panel so as to retain said base, said housing and said panel in assembled relation.

In order that the invention may be clearly understood and readily put into practical effect there shall now be described with reference to the accompanying illustrative drawings preferred embodiments of a bearing according to the present invention.

Figure 1:
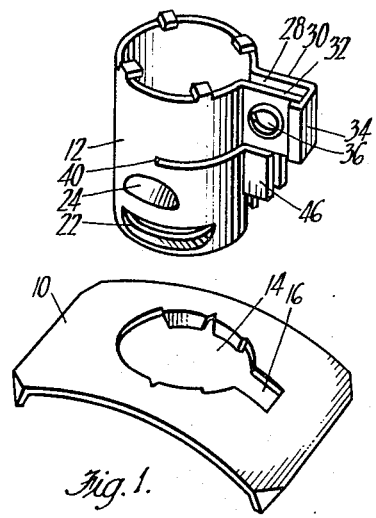
FIG. 1 is a perspective view of a bearing retainer in unassembled configuration.
Figure 3:
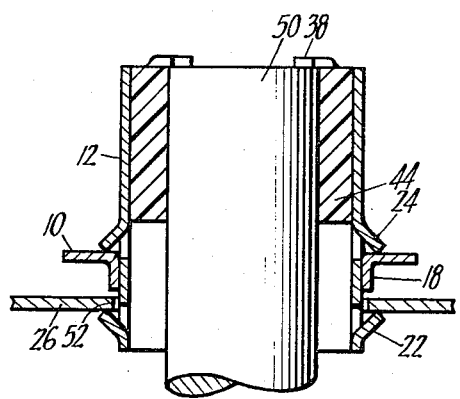
FIG. 3 is a vertical cross-section along the lines and in the direction of arrows 3—3 of FIG. 2.
Figure 2:
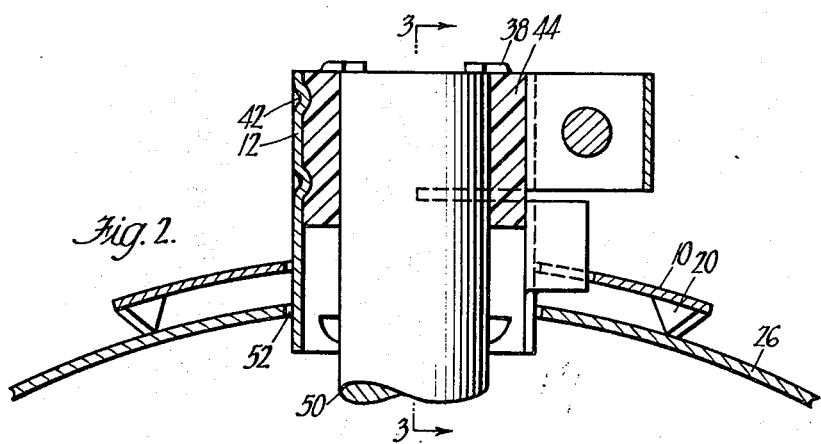
FIG. 2 is a vertical cross-sectional view of the bearing retainer of FIG. 1 in assembled relation and holding a shaft in a panel.

Referring now to FIGS. 1 to 3, there is provided a bearing retainer made in two parts, a base part 10 and a housing part 12. The base 10 is carved in its longitudinal direction at least with the radius of curvature being somewhat the same, although it is preferably smaller, as that of the ducting 26 to which a bearing 44 for a shaft 50 is to be attached.

The base 10 is provided with a hole 14 having an extension portion 16, the hole 14 and extension 16 being adapted to receive the housing 12 as well as a number of downturned flanges 18 around the perimeter of the hole designed to bear against the housing 12 when it is engaged in the base 10. Each of the four corners of the base 10 is turned downwardly to form four legs 20 for engaging with the outersurface of the ducting 26. The base 10 is advantageously made of a spring material, as spring steel for example.

The housing 12 is approximately cylindrically shaped and is split vertically for its entire height by a split 28. At or adjacent its upper end, the housing 12 is provided with two outwardly formed arms 30 and 32 — one on either side of split 28 — arm 30 being provided with a U-shaped folded end 34 which extends around the end of arm 32. The two arms 30 and 32 are provided with a hole 36, which may be screw-threaded, to enable the housing 12 to be clamped onto the bearing 44. Below the arms 30 and 32 the housing 10 is provided with a horizontal slit 40 extending on either side of vertical split 28, the slit 40 being provided to allow the upper region of the housing about the arms 30 and 32 to move so as to clamp onto the bearing 44 whilst permitting the lower region of the housing 12 to retain the approximate cylindrical shape and hence remain in position in the base 10 and ducting 26.

Below the slit 40 are a second pair of outwardly extending parallel arms 46, one on either side of split 28, which are adapted to fit into the extension 16 of hole 14 in base 10 to prevent the housing 12 from rotating relative to the base 10.

Around the upper surface of housing 12 are four equally spaced tabs 38 extending radially-inwardly so as to hold in position linearly the bearing 44 inserted in the housing. At spaced locations about the interior surface of the housing 12 are two small internal projections 42 arranged so as to hold the bearing 44 against both linear and rotational movement.

The housing 12 is provided with two upper lugs 24 and two lower lugs 22 for snap-in engagement with the material about the edge of an opening 52 provided in the ducting 26 and the base 10, there being one of each lug on each side of the housing 12 (see FIG. 3). The lower lugs 22 extend outwardly and upwardly from the exterior surface of the housing 12 while the upper lugs 24 extend downwardly and outwardly from the exterior surface of the housing. These lugs 22 and 24 are of such length and inclination that when the housing and base are fitted to a duct 26, the undersides of lugs 24 press on the upper surface of base 10 and the upperside of lugs 22 press on the lower surface of the duct 26, thus retaining the base 10 and housing 12 in position relative to duct 26.

By reason of the spring tension in the base 10, it will exert a desired holding pressure to secure the housing 12 relative to the duct 26 even if there is a substantial tolerance in the formation of the opening 52 in the duct and the down-turned corners 20 of the base 10 will tend to grip the outer surface of the duct and hold the housing against movement.

Figure 4:
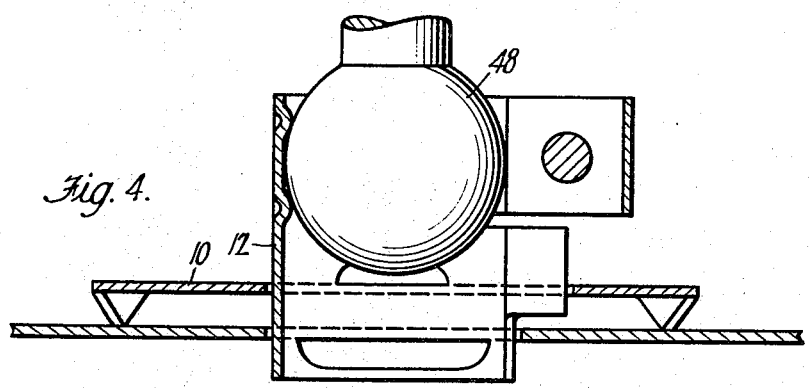
FIG. 4 is a vertical cross-sectional view of a bearing holding a swivel joint in relation to a panel.

FIG. 4 illustrates an embodiment wherein the housing 12 acts as a bearing and retaining means for a swivel joint 48. Here the tabs 38 are not provided and there is no bearing 44, the remainder of the housing 12, as well as the base 10, being identical to those described above. The swivel joint 48 is held in position in the housing 12 by means of the projections 42 which enable it to pivot as desired.

The housing 12 of both illustrated embodiments may be of any suitable material such as metal or a plastics material — such as nylon — and may be made of any desired internal dimension, as may be the bearings — which also may be of any suitable material.

If desired a sealing washer may be provided below the base 10 so as to seal the opening 52 in the duct 26.

The bearing retainer may be used for the bearings of shafts or rods for controlling vanes, doors and other members in air-conditioning and heating ducts and the like as well as having other applications.

While there has been described in the above two embodiments of a bearing according to the present invention, it is to be realized by persons skilled in the art that many changes in details of design or construction may be made without departing from the essential nature of the invention, the scope of which is to be ascertained by the following claims.

What we claim is:

1. A bearing retainer comprising a base having a hole therein to receive a generally cylindrical housing, said housing having a plurality of upper lugs extending outwardly and downwardly therefrom, a plurality of lower lugs extending outwardly and upwardly therefrom, a plurality of inwardly directed projections in said housing, the parts being so arranged that, in use, said plurality of upper lugs act upon said base and said plurality of lower lugs act upon a panel so as to retain said base, said housing and said panel in assembled relation, said housing being further provided with a vertical split extending for the entire height thereof, a first pair of outwardly extending arms extending from said housing on either side of said split, said housing including at least one outwardly extending second arm, said at least one second arm extending from said housing adjacent said split; said at least one second arm being separated from said first pair of arms by a horizontally extending slit in said housing and being adapted to, in use, be received in an extension portion of said hole so as to prevent rotational movement of the housing relative to said base, said base having a generally rectangular configuration and being resiliently curved in at least the longitudinal direction thereof, said base including down-turned feet at each corner thereof and a plurality of down-turned flanges around said hole so as to, in use, bear upon said housing between said plurality of upper lugs and said plurality of lower lugs.

2. A bearing retainer as claimed in claim 1, wherein one of said first pair of outwardly extending arms is provided with a U-shaped folded outer end extending around the outer end of the other of said first pair of outwardly extending arms; each of said first pair of outwardly extending arms having an aperture extending therethrough for accommodating a fastening device.

3. A bearing retainer as claimed in claim 2, wherein said housing is provided with a plurality of radially inwardly directed tabs at the end thereof adjacent said first pair of outwardly extending arms.

4. A bearing retainer as claimed in claim 1 wherein said at least one outwardly extending second arm includes a pair of outwardly extending second arms extending from said housing on either side of said split; said second pair of arms being both separated from said first pair of arms by a horizontally extending slit in said housing and both being adapted to, in use, be received in an extension portion of said hole so as to prevent rotational movement of said housing relative to said base.

5. A bearing retainer as claimed in claim 1 wherein the plurality of inwardly directed projections in said housing engage and retain a cylindrical sleeve of lubricious material having an internal bore adapted to accept a rotating cylinder co-axially disposed within said housing.

6. A bearing retainer as claimed in claim 1 wherein said plurality of inwardly directed projections in said housing are disposed in a predetermined orientation and adapted to accept a spherical element having limited angular movement relative to said housing.

* * * * *